W. P. ALLEN.
POWER TRANSMISSION AND SPEED CONTROLLING DEVICE.
APPLICATION FILED DEC. 18, 1912.

1,112,586.

Patented Oct. 6, 1914.
4 SHEETS—SHEET 1.

Fig. 1.

Witnesses:
O. F. Plumlee
Lucy J. Stone

Inventor:
William P. Allen.
By Burton & Burton
his Atty's

W. P. ALLEN.
POWER TRANSMISSION AND SPEED CONTROLLING DEVICE.
APPLICATION FILED DEC. 18, 1912.

1,112,586.

Patented Oct. 6, 1914.
4 SHEETS—SHEET 2.

W. P. ALLEN.
POWER TRANSMISSION AND SPEED CONTROLLING DEVICE.
APPLICATION FILED DEC. 18, 1912.

1,112,586.

Patented Oct. 6, 1914.
4 SHEETS—SHEET 3.

Witnesses:

Inventor.
William P. Allen.
by Burton & Burton
his attys.

United States Patent Office.

WILLIAM P. ALLEN, OF CHICAGO, ILLINOIS.

POWER-TRANSMISSION AND SPEED-CONTROLLING DEVICE.

1,112,586.    Specification of Letters Patent.    Patented Oct. 6, 1914.

Application filed December 18, 1912. Serial No. 737,380.

*To all whom it may concern:*

Be it known that I, WILLIAM P. ALLEN, a citizen of the United States, residing at Austin, in the city of Chicago, county of Cook, and State of Illinois, have invented new and useful Improvements in Power-Transmission and Speed-Controlling Devices, of which the following is a specification, reference being had to the accompanying drawings, forming a part thereof.

The purpose of this invention is to provide an improved mechanism for transmitting power particularly adapted for variably reducing the speed of the rotary motion in the transmission of the same and readily controlling the reduction at will, the devices for that purpose being especially designed so as to transmit substantially the full power at all speeds.

It consists in the elements and features of construction shown and described as indicated in the claims.

In the drawings, 1 represents the framework of a self-propelled vehicle which carries a motor, conventionally represented at 2, and power-transmitting mechanism involved in this invention.

Figures 2, 9:
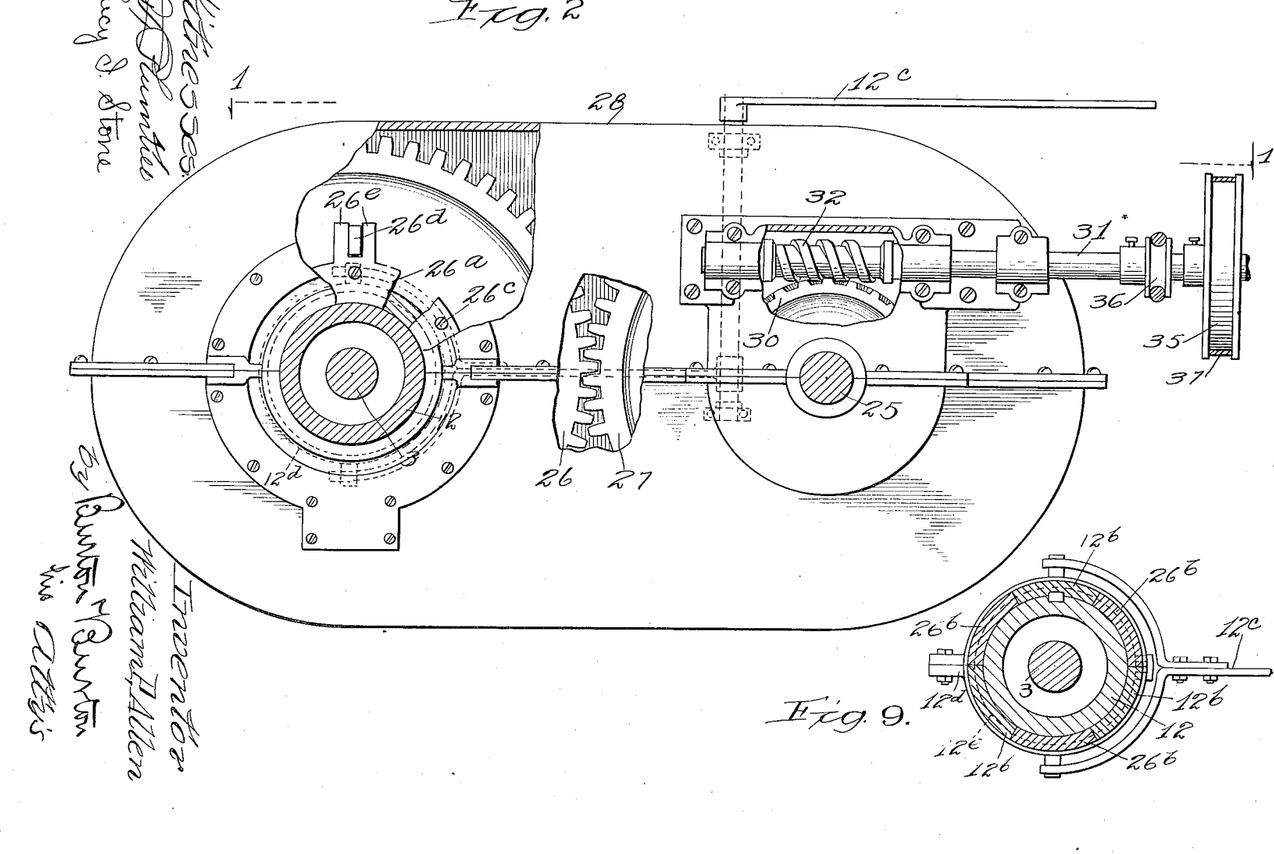
Fig. 2 is a section at the line 2—2 on Fig. 1, showing the casing partly broken away to disclose interior details.
Fig. 9 is a detail elevation of a clutch device on the main shaft.

3 is the principal power-transmitting shaft with which the parts constituting the invention in question are most directly associated. This shaft is driven by any convenient driving connection from the motor shaft, and it may constitute the motor shaft, as shown in the drawings. As applied to the purpose of a tractor, this shaft may have associated with it at two points in its length duplicate transmitting trains operating identically in all respects, and each comprising as the final element a sprocket wheel, 4. One of these trains is fully shown in sectional view on Fig. 2, and the other appears in elevation in that view, the casing, 5, which forms a part of the sprocket wheel, 4, inclosing the remaining elements of the train. The description of one of these trains will answer for both. On the shaft, 3, there is secured fast by a key, 6, an eccentric, 7, upon which there is journaled as a counterpart thereto for operation eccentrically with respect to the shaft a gear, 8, the gear being mounted on the eccentric, preferably by means of a roller bearing which is of familiar construction, comprising the rollers, 9, journaled in annular carriers, 10, 10.

11 is a counterweight arm which is mounted on the shaft, 3, and made rigid therewith by the same key, 6, which secures the eccentric, 7, to said shaft, said counterweight arm being positioned properly for counterbalancing the eccentric, 7, and the gear, 8, thereon.

Figure 1:
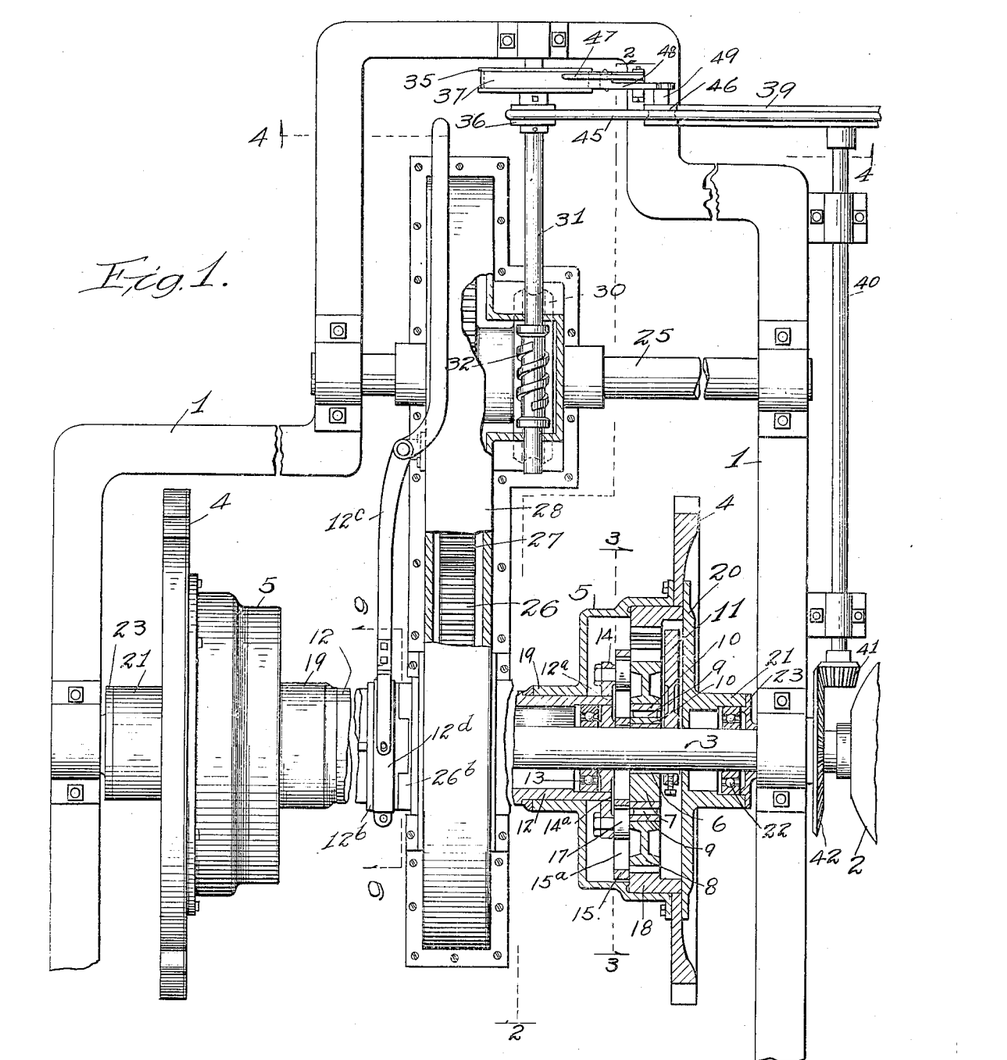
Figure 1 is a partly sectional plan view of a portion of a frame having mounted within it mechanism embodying this invention, sections being made at the line 1—1 on Fig. 2 and 1ˣ—1ˣ on Fig. 3.

12 is a casing sleeve which is provided with means by which it may be held non-rotatable or may be released for rotation at will, as hereinafter described. This sleeve or casing is mounted concentrically with the shaft, 3, for relative rotation of the shaft with respect to the casing by means of ball bearings interposed between the shaft and the sleeve, one near each end of said sleeve within the casing, 5, as seen at 13 in Fig. 1.

14 is a plate which is rigidly engaged with the sleeve, 12, by means of projections, 12ᵃ, at the end of the casing which take into apertures, 14ᵃ, in the plate, this expedient affording a convenient means of assembling the parts, as will hereinafter appear. Encompassing the shaft, 3, intermediate the plate, 14, and the gear, 8, is a trammel plate or ring, 15, which performs the function of a trammel plate by means of two pairs of slots, 15ᵃ and 15ᵇ, situated in diametric lines at right angles to each other. The slots, 15ᵃ, are engaged by stud-and-roll abutments, 16, which project from the side of the gear, 8, and the slots, 15ᵇ, are similarly engaged by similar stud-and-roll abutments, 17, which project from the plate, 14. It will be observed that this trammel plate with the stud-and-roll engagements described connecting the gear, 8, to the plate, 14, controls the action of the eccentric gear when the shaft, 3, and the eccentric, 7, thereon are rotated, causing the eccentric gear to follow a path circular about the axis of the shaft, 3, and eccentric to its own axis without any rotation about its own axis.

Figure 3:
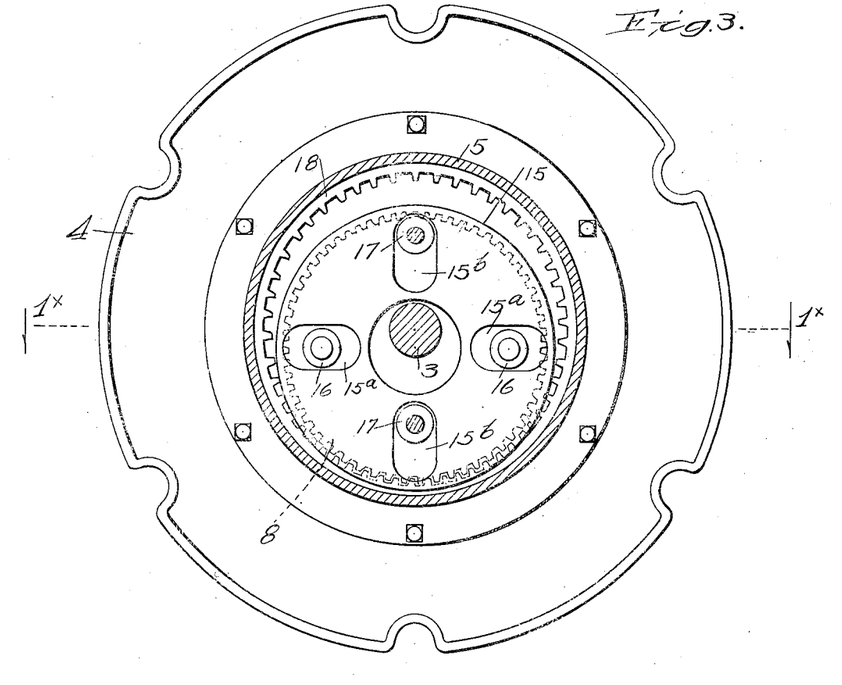
Fig. 3 is a section at the line 3—3 on Fig. 1.
Figure 4:
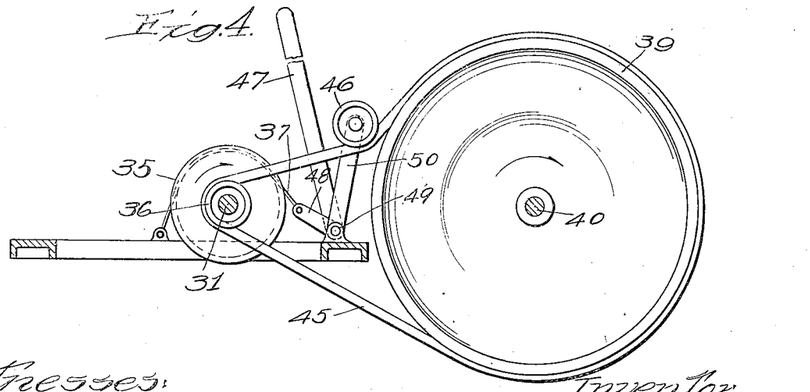
Fig. 4 is a section at the line 4—4 on Fig. 1.
Figure 5:
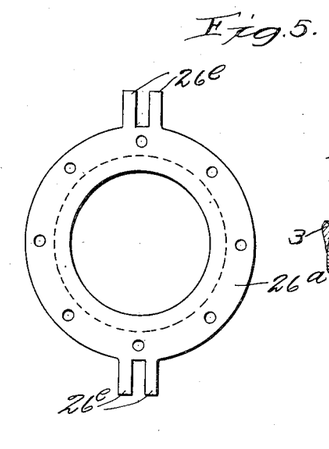
Fig. 5 is a detail elevation of a member of a gear element partly disclosed in Fig. 2.
Figure 6:
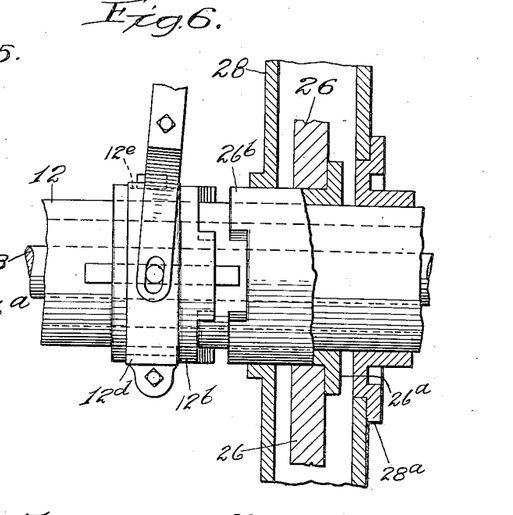
Fig. 6 is a detail section at the line 6—6 on Fig. 1.
Figure 7:
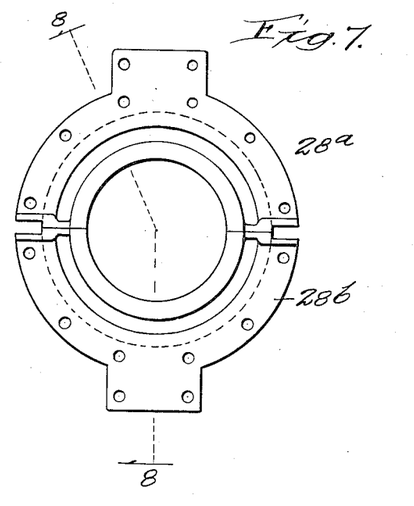
Fig. 7 is a side elevation of a detachable element of a casing shown in Fig. 2.
Figure 8:
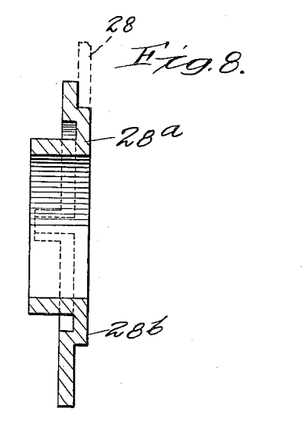
Fig. 8 is a detail section at the line 8—8 on Fig. 7.

18 is an internal gear which is formed rigid with the casing, 5, herein-above mentioned as rigid with and forming part of the sprocket wheel, 4. This casing terminates in a hub, 19, by which it is journaled outside of the casing sleeve, 12, and thereby concentrically with the shaft, 3. The sprocket wheel, 4, and thereby the gear, 18, are provided with a second bearing on the shaft, 3, consisting in a disk or web, 20, having a hub, 21, which is provided with a ball bearing, 22, on the shaft, 3. The internal gear, 18, has a pitch equal to the greatest radius of the eccentric gear,—that is, the pitch radius of said eccentric gear measured from the shaft, 3, at the point of greatest eccentricity of said gear, 8,—and thereby said gear, 8, is adapted to mesh with said internal gear, 18, as seen in Fig. 3. The internal gear, 18, is designed to have a small number of teeth in excess of the number of teeth of the gear, 8. As illustrated in the drawings, the internal gear has one-eighth greater number of teeth than the eccentric gear, 8.

The construction above described, it will be understood, causes the eccentric gear, 8, to transmit to the internal gear, 18, rotary motion derived from the shaft, 3, in the same direction as that in which the shaft rotates and at a speed whose ratio to that of the shaft is the ratio of the difference between the number of teeth on the two gears to the number of teeth on the internal gear; that is, in the specific construction shown in the drawings, one revolution to nine revolutions of the shaft.

The ends of the hubs, 21, are closed by caps, 23, fitting about the shaft, 3, and thereby there is formed a continuous oil chamber within the continuous casing formed by the sleeve casing, 12, the casing, 5, the sprocket wheel, 4, and the disk, 20, and its hub, 21, so that both trains contained within the casing, 5, run in a lubricant at all times.

It will be observed that if the gear, 8, is not restrained at all as to rotation about its own axis by the trammel device mounted upon the sleeve, 12, but if, on the contrary, said gear, 8, revolves freely about its axis, as will be the case when the clutch, 12$^a$, is disengaged so that the sleeve, 12, is not connected for rotation with the gear, 27, and the rotation of the sprocket wheel, 4, is blocked by a certain amount of work with which it is connected, the gear, 8, will merely roll around within the internal gear, 18, without rotating the latter at all, said gear, 8, being rotated about its axis in the reverse direction from that of the shaft, 3, and eccentric, 7, at a speed one-eighth greater than that of the shaft; and that in thus rotating it will carry the trammel device with it at the same speed. It will be seen, furthermore, that if the trammel device is partly restrained against rotation so as to partly restrain the rotation of the gear, 8, the result will be a rotation of the gear, 18, at a speed which will be such proportion of one-ninth of the speed of the shaft, 3, as the diminution of speed of the gear, 8, and trammel device is of the full speed of the shaft.

25 is a countershaft parallel with the shaft, 3, journaled in the same frame.

26 is a gear which is mounted loose on the casing sleeve, 12, and connected therewith for rotation thereby by means of a clutch comprising a sliding member, 12$^b$, feathered on the sleeve for sliding thereon, the counterpart member being formed as the hub, 26$^b$, of the gear, 26. A shipping lever, 12$^c$, is fulcrumed on the casing, 28, and connected by pivots, 2$^d$, with a two-part collar, 12$^d$, which engages a peripheral groove, 12$^e$, in the clutch member, 12$^b$, for sliding said clutch member on the sleeve into and out of engagement with the counterpart clutch member,—said hub, 26$^b$, of the gear, 26. The casing, 28, incloses both said gears, 26 and 27, such casing being provided with bearings by which it is hung on the sleeve, 12, and on the shaft, 25. The hug, 26$^b$, of the gear, 26, protrudes through the casing to form the counterpart clutch member coöperating with the clutch sleeve, 12, as described. Rigid with the shaft, 25, and, if preferred, integral with the gear, 27, there is mounted a worm wheel, 30, and in the casing, 28, there is journaled a shaft, 31, having a worm, 32, which meshes with the worm wheel, 30, the worm thread being at such a pitch that the worm wheel, 30, will readily communicate rotary motion to the shaft, 31, by its engagement with said worm, 32. The shaft, 31, extends outside of the casing, 28, and on its exteriorly protruding portion there is mounted rigid with it a brake wheel, 35, and a pulley or band wheel, 36. The brake wheel is fitted with a brake shoe, 37, from which connections are provided by which the operator may apply sufficient pressure to control, and if desired, entirely prevent, the rotation of the shaft, 31.

39 is a pulley on a shaft, 40, which is rotated by any convenient means of transmitting motion to it from the motor, as by a gear, 42, on the shaft, 3, meshing with a gear, 41, on the shaft, 40. A belt, 43, connecting the pulley, 39, with the pulley, 36, rotates the latter in the same direction in which said pulley, 36, is rotated by the rotation of the gear, 30, meshing with the worm, 32. A tightener pulley, 46, is provided for taking up the slack in the belt, 45, which when entirely slack is too loose to drive the pulley, 36. The lever, 41, controlling the tightener pulley enables the operator to cause the shaft, 31, to revolve at any rate of speed up to the maximum which can be communicated by the connections shown from the main shaft, 3, and the connections are designed to be such that the maximum speed communicated may be such as to rotate the gears, 26 and 27, at the maximum speed of the sleeve, 12; that is, the speed which it derives when the internal gear, 18, is held at rest by the resistance of the work with which the sprocket wheel, 4, is connected. When the application of the tightener pulley has brought the speed of the gear, 26, up to said speed of the sleeve, the operator may throw the clutch in mesh connecting the sleeve with the gear, 26, without jar. If now, when the clutch has been connected as described, the tightener pulley is withdrawn so as to cease to drive the worm, 32, and the brake is applied so as to check the rotation of said worm which it will otherwise derive from the worm wheel with which it is meshed, the speed of the gears, 26 and 27, and the sleeve, 12, now engaged therewith by the clutch being restrained, the rotation of the gear, 8, about its own axis will be correspondingly restrained and rotation will be communicated to the internal gear, 18, and the sprocket wheel, 4, in proportion to this restraint, such rotation being in the same direction as that of the shaft, 3, and reaching a speed, according to the construction shown in the drawings, of one-ninth that of said shaft, 3, when the rotation of the gears, 26 and 27, and the sleeve, 12, is entirely prevented by the restraint imposed by the brake. It will also be observed that by rotating the shaft, 31, in the same direction in which it would be rotated by the connections extending from said shaft back to the trammel device and gear, 8, at any speed less than that which it would derive from the maximum speed of rotation which the gear, 8, can derive from the shaft, 3, the speed of the sprocket wheel, 4, can be positively controlled at any rate from zero up to its normal maximum speed of one-ninth that of the shaft, 3, and that by using this means to positively rotate the shaft, 31, as distinguished from merely restraining its rotation by the brake device, the operator may cause the sprocket wheel, 4, to rotate with the full power which can be derived from the motor on the shaft, 3, at any speed suitable to the work to be done, up to the said maximum normal speed of said sprocket wheel, 4. When this device is applied to such purpose as that of a tractor, the operator is by this means enabled to start the tractor from rest as gradually as desired, bringing into operation the full power of a motor running at its maximum speed for the purpose of starting, and gradually increasing the speed of the tractor as it gains momentum and can be thus increased in speed without causing it to slip. This is the purpose of the construction shown.

It will be evident that the brake will never be applied when the pulley, 36, is being driven by the belt; that is, that the tightener and the brake shoe would never be in service at the same time; on the contrary, in modifying the speed from the highest to the lowest, the action would be to slacken the brake until it was entirely out of action, and then gradually apply the tightener until the speed of the pulley, 36, reached the maximum. It is therefore feasible to connect the brake lever and the tightener lever for simultaneous and consecutive operation, the movement of the operating device in one direction withdrawing the tightener and applying the brake, and in the opposite direction withdrawing the brake and applying the tightener. This is conveniently accomplished, as shown, by connecting the brake strap or shoe, 37, with an arm, 48, of the same rock shaft, 49, which on another arm, 50, carries the tightener pulley, 46, the hand lever, 47, of said rock shaft thus serving the operator for controlling the brake and the tightener, as described, by continuous movement in the one direction for slacking the speed, and in the other direction for increasing it.

The specific construction of the casing, 28, and the gear, 26, shown in the drawings, is designed for convenience in assembling the parts, the gear, 26, being made in two pieces,—an outer piece which comprises the gear rim, and a central piece, 26$^a$, which has the hub, 26$^b$, above mentioned, said central piece being in the form of a flanged collar adapted to be bored out for seating accurately on the sleeve, 12, the two parts of the gear, 26 and 26$^a$, being secured together by screws, 26$^c$, taking through the flange of the collar, 26$^a$, into the body of the outer member of the gear. In addition to the screws for securing the two pieces together, they are further connected for positive rotation of the outer by the inner by means of lugs, 26$^d$, which project from the face of the outer member and are engaged between the lugs, 26$^e$, which project radially from said inner member. The casing, 28, comprises two members parted at the plane containing the axes of the shafts, 3 and 25, and provided with flanges by which the two members are secured together. One side of the casing is provided with a removable plate comprising two members, 28$^a$ and 28$^b$, which are adapted to be applied to that side, closing except as to the opening required for the sleeve, 12, an aperture therein which is suitable for receiving the central member, 26$^a$, of the gear, 26. It will be observed that all the cavities of the housings or casings containing the gear trains described are adapted to communicate so as to constitute a continuous lubricant chamber which may be filled with lubricant in which all the shafts and gears run.

I claim:—

1. In a power-transmitting device, in combination with a rotating shaft, an eccentric thereon; a spur gear journaled on the eccentric; an internal gear having a greater number of teeth than the spur gear meshing with the latter and journaled concentrically with the shaft; a trammel device for controlling the rotation of the spur gear about its own axis, and means controllable at will for rotating the trammel device about the axis of the shaft.

2. In a power-transmitting device, in combination with a rotating shaft, an eccentric thereon; a spur gear journaled on the eccentric; an internal gear having a greater number of teeth than the spur gear meshing with the latter and journaled concentrically with the shaft; a trammel device for controlling the rotation of the spur gear about its own axis; means for rotating the trammel device about the axis of the shaft, and means for varying at will the rate of such rotation.

3. In a power-transmitting device, in combination with a rotating shaft; an eccentric thereon; a spur gear journaled on the eccentric; an internal gear having a greater number of teeth than the spur gear meshing with the latter and journaled concentrically with the shaft; a plate surrounding the shaft and means for holding it against rotation therewith; a trammel plate mounted on the shaft between the last-mentioned plate and the spur gear, said trammel plate having slots in diametral lines, transverse to each other; abutments on the gear engaging said slots in one of said lines, and abutments on the plate engaging the slots in the other of said lines; a sleeve co-axial with the shaft engaged endwise with the plate for rotating or holding the same against rotation about the shaft; a casing journaled on the sleeve and rigid with said internal gear, and means for holding the sleeve against rotation about the shaft.

4. In a power-transmitting device, in combination with a rotating shaft, an eccentric thereon; a spur gear journaled on the eccentric; an internal gear having a greater number of teeth than the spur gear meshing therewith and journaled concentrically with the shaft; a sleeve encompassing the shaft, and roller bearings by which it is spaced therefrom and journaled thereon, the means by which the internal gear is journaled concentrically with the shaft comprising a casing rigid with said gear and journaled on the sleeve; a trammel device for controlling the rotation of the spur gear about its own axis, comprising a plate within the last-mentioned casing engaged by the sleeve for holding thereby or rotation therewith; a trammel plate interposed between the last-mentioned plate and the spur gear having sliding connection with both, said connections being for sliding in lines transverse to each other, and means for controlling the rotation of the sleeve about the shaft.

5. In a power-transmitting device, in combination with a rotating shaft, a casing sleeve encompassing the shaft for a part of its length; two power-transmitting wheels, one at each end of the sleeve, each having a hollow hub constituting a gear casing, said casing being journaled at one end directly on the sleeve, and at the other end indirectly on the shaft beyond the end of the sleeve; ball bearings interposed on the shaft between the same and the sleeve for journaling the latter on the former, and ball bearings by which the outer end of the wheel hub is journaled on the shaft; collars which close the outer ends of the casing hubs and are journaled directly on the shaft, and gear trains within the casing hubs of the power wheels, respectively, for transmitting rotation from the shaft to said wheels.

6. In a power-transmitting device, in combination with a rotating shaft, a casing sleeve encompassing the shaft for a part of its length; a power transmitting wheel at one end of the sleeve having a hollow body constituting a gear casing, said casing being journaled at one end directly on the sleeve, and at the other end indirectly on the shaft beyond the end of the sleeve; ball bearings interposed on the shaft between the same and the sleeve for journaling the latter on the former, and ball bearings by which the outer end of the wheel hub is journaled on the shaft; a collar which closes the outer end of the casing hub and is journaled directly on the shaft; means for closing the opposite end of the sleeve, and a gear train within the casing hub of the power wheel for transmitting rotation from the shaft to said wheel.

7. In a power-transmitting device, in combination with a rotating shaft, a sleeve encompassing the same for a portion of its length; bearing devices by which the sleeve is spaced from and journaled on the shaft; a power-transmitting wheel mounted on the shaft at one end of the sleeve comprising a gear casing encompassing the shaft and having hubs, one of said hubs being journaled directly on the sleeve and the other on the shaft beyond the end of the sleeve; a gear train within said gear casing for communicating rotation from the shaft to the power-transmitting wheel, said train comprising an element adapted to be either rotated or held non-rotatable with respect to the shaft, the sleeve having one end extended into the gear casing for engaging said element; one member of a spiral gear pair connected with the sleeve for rotation therewith; a shaft having the other member of such pair engaging said first member, means for communicating rotation to said last-mentioned shaft, and a brake device for retarding the rotation of said shaft.

8. In a power-transmitting device, in combination with a rotating power shaft, a sleeve encompassing said shaft for a portion of its length, and bearing devices by which the sleeve is spaced from and journaled on the shaft; a power-transmitting wheel mounted on the shaft at one end of the sleeve comprising a gear casing which encompasses the shaft and has hubs of which one is journaled directly on the sleeve and the other on the shaft beyond the sleeve; a gear train within said casing for communicating rotation from the shaft to the power-transmitting wheel, said train comprising an element adapted to be either rotated with, or held non-rotatable with respect to, the shaft, the sleeve having one end extended into the gear casing for engaging said element; one member of a spiral gear pair connected with the sleeve for rotation therewith; a shaft having the other member of such pair engaging said first member for communicating rotation to the last-mentioned shaft, and means for controlling its rotation at will.

9. In a power-transmitting device, in combination with a rotating power shaft, a sleeve encompassing said shaft for a portion of its length, and bearing devices by which the sleeve is spaced from and journaled on the shaft; a power-transmitting wheel mounted on the shaft at one end of the sleeve comprising a gear casing which encompasses the shaft and has hubs, of which one is journaled directly on the sleeve and the other on the shaft beyond the sleeve; a gear train within said casing for communicating rotation from the shaft to the power-transmitting wheel, said train comprising an element adapted to be either rotated with, or held non-rotatable with respect to, the shaft, the sleeve having one end extended into the gear casing for engaging said element; a worm gear connected with the sleeve for rotation therewith; a shaft having a worm engaging said worm gear; a brake device operable at will for retarding the rotation of said shaft; frictional driving means and means for varying the frictional engagement to vary the speed at which the shaft is rotated.

10. In a power-transmitting device, in combination with a rotating shaft, a sleeve encompassing the same for a portion of its length, and bearing devices by which the sleeve is spaced from and journaled on the shaft; two power-transmitting wheels mounted on the shaft at opposite ends of the sleeve, each comprising a gear casing encompassing the shaft and having hubs one of which is journaled directly on the sleeve and the other on the shaft beyond the sleeve; gear trains within said casings for communicating rotation from the shaft to said power-transmitting wheels, respectively; said gear trains comprising each an element adapted to be rotated or to be held non-rotatable with respect to the shaft, the sleeve having its ends extended into the casing for engaging said elements, respectively, and means for controlling the rotation of the sleeve.

11. In a power-transmitting device, in combination with a rotating shaft, a sleeve encompassing the same for a portion of its length, and bearing devices by which the sleeve is spaced from and journaled on the shaft; two power-transmitting wheels mounted on the shaft at opposite ends of the sleeve, each comprising a gear casing encompassing the shaft and having hubs one of which is journaled directly on the sleeve and the other on the shaft beyond the sleeve; gear trains within said casings for communicating rotation from the shaft to said power-transmitting wheels, respectively; said gear trains comprising each an element adapted to be rotated or to be held non-rotatable with respect to the shaft; the sleeve having its ends extended into the casing for engaging said elements, respectively; one member of a spiral gear pair connected with the sleeve for rotation therewith; a shaft having the other member of such pair engaging said first member; means for communicating rotation to said shaft; a brake wheel on said shaft and a brake device for engaging the brake wheel.

12. In a power-transmitting device, in combination with a rotating shaft, a sleeve encompassing the same for a portion of its length, and bearing devices by which the sleeve is spaced from and journaled on the shaft; two power-transmitting wheels mounted on the shaft at opposite ends of the sleeve, each comprising a gear casing encompassing the shaft and having hubs one of which is journaled directly on the sleeve and the other on the shaft beyond the sleeve; gear trains within said casings for communicating rotation from the shaft to said power-transmitting wheels, respectively; said gear trains comprising each an element adapted to be rotated or to be held non-rotatable with respect to the shaft; the sleeve having its ends extended into the casing for engaging said elements, respectively; one member of the spiral gear pair connected with the sleeve for rotation therewith; a shaft having the other member of such pair engaging said first member, and means for communicating rotation to said shaft and for controlling its rotation at will.

13. In a power-transmitting device, in combination with a rotating shaft, a sleeve encompassing the same for a portion of its length, and bearing devices by which the sleeve is spaced from and journaled on the shaft; two power-transmitting wheels mounted on the shaft at opposite ends of the sleeve, each comprising a gear casing encompassing the shaft and having hubs one of which is journaled directly on the sleeve and the other on the shaft beyond the sleeve; gear trains within said casings for communicating rotation from the shaft to said power-transmitting wheels, respectively; said gear trains comprising each an element adapted to be rotated or to be held non-rotatable with respect to the shaft; the sleeve having its ends extended into the casing for engaging said elements, respectively; one member of a spiral gear pair connected with the sleeve for rotation therewith; a shaft having the other member of such pair engaging said first member; means for variably resisting the rotation of said shaft, means for variably communicating rotation to the same, and means for controlling at will said resisting means and said rotating means.

14. In combination with a power shaft and a power wheel thereon, a gear train whose members are mounted on the shaft for transmitting motion between the shaft and the wheel, said train comprising a part whose retardment tends to increase and whose acceleration tends to reduce the motion transmitted between the shaft and wheel; a sleeve on the shaft and means connecting it with said retardable part of the train; a separate train for rotating said sleeve, and means for varying at will the speed of said separate train.

15. In combination with a power shaft and a power wheel thereon, a gear train whose members are mounted on the shaft for transmitting motion between the shaft and the wheel, said train comprising a part whose retardment tends to increase and whose acceleration tends to reduce the motion transmitted between the shaft and wheel; a sleeve on the shaft and means connecting it with said retardable part of the train; a separate train for rotating said sleeve, said separate train comprising a clutch engageable and disengageable for transmitting or interrupting the transmission of motion from said train.

16. In combination with a power shaft and a power wheel thereon, a gear train whose members are mounted on the shaft for transmitting motion between the shaft and the wheel, said train comprising a part whose retardment tends to increase and whose acceleration tends to reduce the motion transmitted between the shaft and wheel; a sleeve on the shaft and means connecting it with said retardable part of the train; a separate train for rotating said sleeve, said separate train comprising a clutch engageable and disengageable at will to transmit or interrupt the transmission of motion from said train, and means for varying at will the speed of said separate train.

17. In combination with a power shaft and a power wheel thereon, a gear train whose members are mounted on the shaft for transmitting motion between the shaft and the wheel, said train comprising a part whose retardment tends to increase and whose acceleration tends to reduce the motion transmitted between the shaft and wheel; a sleeve on the shaft and means connecting it with said retardable part of the train; a separate train for rotating said sleeve, said train comprising a spiral gear pair and a brake for retarding the motion of the more rapidly rotating of the two members of said pair.

18. In combination with a power shaft and a power wheel thereon, a gear train whose members are mounted on the shaft for transmitting motion between the shaft and the wheel, said train comprising a part whose retardment tends to increase and whose acceleration tends to reduce the motion transmitted between the shaft and wheel; a sleeve on the shaft and means connecting it with said retardable part of the train; a separate train for rotating said sleeve, said train comprising a spiral gear pair and means for retarding at will the speed of said separate train.

19. In combination with a power shaft and a power wheel thereon, a gear train whose members are mounted on the shaft for transmitting motion between the shaft and the wheel, said train comprising a part whose retardment tends to increase and whose acceleration tends to reduce the motion transmitted between the shaft and wheel; a sleeve on the shaft and means connecting it with said retardable part of the train; a separate train for rotating said sleeve, and a brake device for retarding said train.

20. In a power-transmitting device, in combination with a rotating shaft and eccentric thereon, a spur gear journaled on the eccentric; an internal gear having a greater number of teeth than the spur gear meshing with the latter and journaled concentrically with the shaft; a trammel device for controlling the rotation of the spur gear about its own axis, and means for controlling the rotation of the trammel device about the axis of the shaft comprising a spiral gear pair, and means by which one member of the pair is actuated by the trammel device.

21. In a power-transmitting device, in combination with a rotating shaft and eccentric thereon, a spur gear journaled on the eccentric; an internal gear having a greater number of teeth than the spur gear meshing with the latter and journaled concentrically with the shaft; a trammel device for controlling the rotation of the spur gear about its own axis, and means for controlling the rotation of the trammel device about the axis of the shaft comprising a spiral gear pair; means by which one member of the pair is actuated by the trammel device, and means for controlling at will the other member of the pair.

In testimony whereof, I have hereunto set my hand, at Kearney, Neb., this 17th day of August, 1912.

WILLIAM P. ALLEN.

Witnesses:
C. D. BESSIE,
J. BOYD ALLEN.